(12) United States Patent
Seido et al.

(10) Patent No.: US 8,182,960 B2
(45) Date of Patent: May 22, 2012

(54) METAL SEPARATOR FOR FUEL CELLS AND FABRICATING METHOD THEREOF

(75) Inventors: Masahiro Seido, Tsuchiura (JP); Kazuhiko Nakagawa, Tsuchiura (JP); Takaaki Sasaoka, Tsuchiura (JP); Mineo Washima, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 917 days.

(21) Appl. No.: 12/212,116

(22) Filed: Sep. 17, 2008

(65) Prior Publication Data
US 2009/0081520 A1    Mar. 26, 2009

(30) Foreign Application Priority Data
Sep. 20, 2007    (JP) ................................ 2007-243964

(51) Int. Cl.
*H01M 8/04* (2006.01)
*H01M 8/24* (2006.01)
*H01M 4/64* (2006.01)

(52) U.S. Cl. ......... 429/514; 429/522; 429/457; 429/456

(58) Field of Classification Search .................. 429/514, 429/522, 457, 456
See application file for complete search history.

(56) References Cited

U.S. PATENT DOCUMENTS
2001/0008719 A1*  7/2001  Ikeda .............................. 429/12
2003/0145643 A1*  8/2003  Yoshioka et al. ............... 72/348

FOREIGN PATENT DOCUMENTS
JP   2002-075401   3/2002
JP   2005-190968   7/2005
JP   2007-149478   6/2007

* cited by examiner

*Primary Examiner* — Helen O Conley
(74) *Attorney, Agent, or Firm* — Brundidge & Stanger, P.C.

(57) ABSTRACT

A metal separator for fuel cells formed with a metal plate and provided between cells accumulated, in which the metal plate is formed like trapezoidal irregularities to separate channels for a fuel gas from ones for an oxidant gas. Slope portions are formed after forming uniformly and thinly wall thickness of both upper and lower flat portions or either of the upper or the lower flat portion to 90% or less of that of the metal plate to be formed to obtain trapezoidal irregularities by forming flat portions which contact upper and lower cells and slope portions which interconnect the upper and the lower flat portions.

9 Claims, 7 Drawing Sheets

(a)

(b)

(a)

(b)

METAL SEPARATOR FOR FUEL CELLS AND FABRICATING METHOD THEREOF

BACKGROUND OF THE INVENTION

The present invention relates to a metal separator for fuel cells, formed with a metal plate and provided between cells accumulated, and a fabricating method thereof. In the metal separator, the metal plate is formed like trapezoid irregularities to separate channels for a fuel gas from ones for an oxidant gas. The present invention especially relates to a metal separator for fuel cells with the shape of high accuracy and a fabricating method thereof, in which the processing characteristic of the metal plate is improved before molding one.

A proton-exchange membrane fuel cell is a fuel cell which uses the film of solid polymer electrolyte which passes an ion. A structural body that an anode electrode and a cathode electrode are placed in the inside and outside of the solid polymer electrolyte is called an electrolyte-electrode complex. Electrical energy is generated by the chemical reaction energy of a fuel gas and an oxidant gas by supplying the fuel gas to the anode electrode side of the electrolyte-electrode complex, and supplying the oxidant gas to the cathode electrode side. The typical one as the fuel gas is hydrogen, and atmosphere is used as an oxidant gas. Usually, fuel cells are piled up in plural layers to obtain a high electric power because a voltage which can be taken out by this electrochemical reaction is low, about 1V. One layer of the fuel cell is called a fuel cell, and plural layers of fuel cells piled up are called a fuel cell stack.

When the fuel cells are piled up, a separator is used to separate oxygen of an cathode electrode from hydrogen of an anode electrode of the adjacent cell. The separator only separates neither oxygen nor hydrogen but also efficiently supplies hydrogen or oxygen and drains the produced water through a minute pit of about 1-3 mm in depth and about 0.5 mm in pit space formed on a surface. Moreover, the separator plays role in collecting the electron from the anode electrode and supplying to the cathode electrode of the cell which adjoins.

As for the separator which plays role like the above-mentioned, Permeability of hydrogen be low, the formability which can process a minute pit to the surface, low contact resistance to collect electrons, high electric conductivity, and high corrosion resistance are requested in order to separate hydrogen and oxygen.

There is problems in the toughness and the processing characteristic though the graphite has been used as a material which meets these requirements demanded as a separator.

The separator which uses a metal is also used. The advantages of a metal separator are in that the productivity can be remarkably improved by using press molding to reduce the cost, and the fuel cell can be downsized because it is possible to thin due to high toughness. On the other hand, the biggest problem for the use of the metallic material is deterioration in cell characteristics due to corrosion. To cope with this problem, cheap materials such as iron, stainless steel, aluminum, and copper are used as a base material, and precious metals such as Au, Pt, etc. which satisfies both corrosion resistance and high electrical conductivity are plated on the base material. Or, Ti that the corrosion resistance is high is bonded on the base material by rolling etc., and the coating processing is carried out to prevent contact resistance.

With regard to a forming method of the pit of a metal separator, press molding is chiefly used. In this method, the separator is formed in one or several processes. Because one process completes within several seconds, productivity is high. This forming method has merits and demerits. There is a problem with a low degree of freedom of shape compared with a separator made of graphite. However, there is a merit that a compact cell stack can be made.

JP 2005-190968 A discloses a method of controlling contact resistance, in which a contact side of a electrolyte-electrode complex is made smooth by forming pit form once and forming the pit form again flatly after the top portion is curved. However, this method is difficult for the material that the deformation degree of irregularities fabrication is large, and the expansion is low.

JP 2007-149478 A discloses a method of controlling contact resistance, in which the decrease in board thickness in the corner portion is compensated by using a metal mold having convex corners in the fabrication of the separator, and the contact side of an electrolyte-electrode complex is made smooth. The processing characteristic of the material can be somewhat improved even by this.

JP 2005-190968 A and JP 2007-149478 A disclose a method in which the conventional stretch molding method is partially improved. In a material having bad processing characteristic, tensile elongation reaches its limit, thus cracks are apt to occur, because in these methods tensile bending stress is applied to outside corner 112 where the stretch molding is carried out as shown in FIG. 11.

JP 2002-75401 A discloses a method in which concave sides 122 of irregularities of a separator are pressed against with rounding tool 123 to thin the wall thickness of a point of a rounding portion, and thereby convex sides 124 on the other side are made smooth by just that much (Refer to FIG. 12). However, the tensile stress is occurred as well as the stretch molding, and the possibility to crack is high for a material having a bad processing characteristic in the first deformation process. In this method, the processing characteristic is not improved effectively though the compressive force is applied to decrease wall thickness after familiarizing with a mold.

BRIEF SUMMARY OF THE INVENTION

A problem of the prior art is in that a material having a bad processing characteristic cracks in a press molding process of the separator, and is not formed as a separator even if materials that the corrosion resistance is high and the characteristic and lifetime of the separator are excellent is used.

The fabrication of a metal separator for fuel cells is chiefly performed by a stretch molding method so far. Because tensile force required for the stretch molding is applied to a material for the separator, and a crack occurs when it exceeds the limit expansion of the material.

With regard to the characteristic of the separator, the influence of shape is also large. As to irregularities of the separator, deep and small pitches are required. However, a material having a bad processing characteristic cannot be formed to such shape so far.

Austenitic SUS (stainless steel) has the expansion of 40 to 50% and has enough formability. However, the material having expansion of about 30% and low ductility is expected to improve characteristics of a fuel cell For instance, the tensile elongation is in order of 10 to 20% in superconducting processing Ti clad Al from which lightness is expected. Only shallow shape of irregularities can be formed in the prior art.

An object of the present invention is to provide a metal separator for fuel cells and a fabricating method thereof, by which even when a material having low ductility and a bad processing characteristic is used, it is possible to process complex irregularities without cracking and with a high degree of accuracy.

In one aspect of the present invention, a metal separator for fuel cells is formed with a metal plate and provided between cells accumulated, in which the metal plate is formed like trapezoidal irregularities to separate channels for a fuel gas from ones for an oxidant gas. Where, slope portions are formed after forming uniformly and thinly wall thickness of both upper and lower flat portions or either of the upper or the lower flat portion to 90% or less of that of the metal plate to be formed to obtain trapezoidal irregularities by forming flat portions which contact upper and lower cells and slope portions which interconnect the upper and the lower flat portions.

Preferably, the metal plate consists of material having expansion of 30% or less and low ductility.

Preferably, the metal plate consist of Ti clad aluminum in which Ti covers both sides of plate aluminum or Ti clad stainless steel in which Ti covers both sides of plate stainless steel.

Preferably, in the metal separator for fuel cells, the wall thickness of said flat portions is adjusted to 90% or less by applying a compressive stress to the position where corresponds to flat portions of said metal plate by press working, thereby, lower flat portions which contact one side of said cell and a swelling portion between the lower flat portions are formed, and then slope portions and an upper flat portion are formed at this swelling portion by press working.

Preferably, in the metal separator for fuel cells, compressibility of said flat portions is set to a value smaller than reciprocal of the expansion rate by forming said metal plate to irregularities.

Another aspect of the present invention is a method of fabricating a metal separator for fuel cells formed with a metal plate and provided between cells accumulated, in which the metal plate is formed like trapezoidal irregularities to separate channels for a fuel gas from ones for an oxidant gas. The fabricating method comprises a step of: forming slope portions after forming uniformly and thinly wall thickness of both upper and lower flat portions or either of the upper or the lower flat portion to 90% or less of that of the metal plate to be formed in order to obtain trapezoidal irregularities by forming flat portions which contact upper and lower cells, and slope portions which interconnect the upper and the lower flat portions.

Preferably, in the method of fabricating a metal separator for fuel cells, the said slope portion forming step includes a compression press process for adjusting the wall thickness of said flat portions to 90% or less by applying a compressive stress to the position where corresponds to flat portions of said metal plate, thereby, forming lower flat portions which contact one side of said cell and a swelling portion between the lower flat portions, and a molding press process for forming slope portions and an upper flat portion at this swelling portion.

Preferably, in the method of fabricating a metal separator for fuel cells, the slope portion forming step includes: a first compression press process for adjusting the wall thickness of said flat portions to 90% or less by applying a compressive stress to the position where corresponds to flat portion of said metal plate, thereby, forming lower flat portions which contact one side of said cell and a swelling portion between the lower flat portions; a second compression press process for applying a compressive stress to the position where corresponds to an upper flat portion of said swelling portion and adjusting the wall thickness of said upper flat portion to 90% or less; and a molding press process for forming slope portions and an upper flat portion at this swelling portion.

The wavy irregularities suitable for the separator can be fabricated even when a hard-processing material with a low ductility is used according to the present invention.

DETAILED DESCRIPTION OF THE PREFERRED EMBODIMENTS

Figure 1:
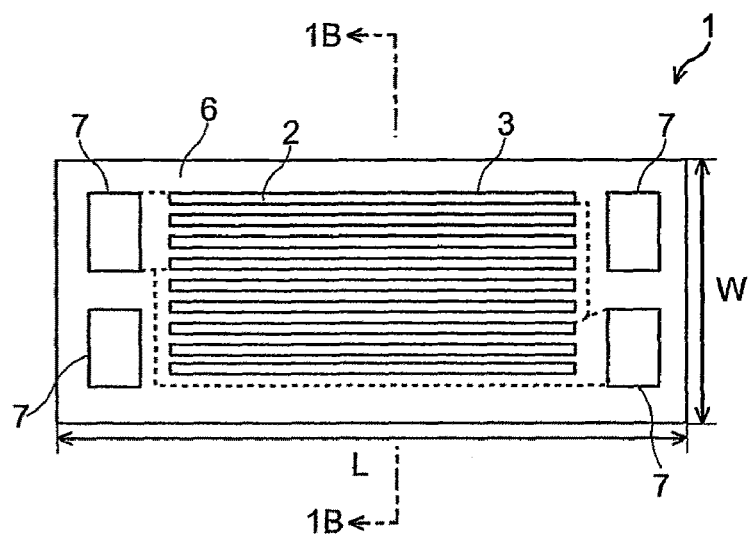
FIG. 1A is a schematic view showing a metal separator for fuel cells according to a preferable embodiment of the present invention.
FIG. 1B is a cross section view taken along 1B-1B line shown in FIG. 1A.
Figure 1:
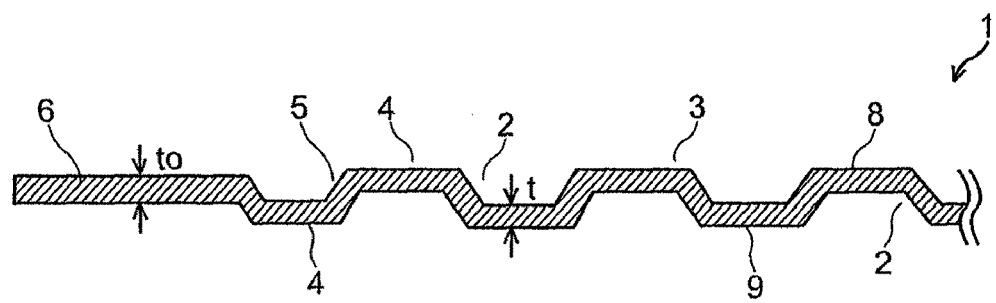

Preferable embodiments of the present invention are explained with reference to attached drawings.

A metal separator for fuel cells according to this embodiment is installed between cells accumulated in a proton-exchange membrane fuel cell, and used to separate the channel of the fuel gas from the oxidant gas.

FIG. 1A is a schematic view showing a metal separator for fuel cells according to a preferable embodiment of the present invention. FIG. 1B is a cross section view taken along 1B-1B line shown in FIG. 1A.

As shown in FIG. 1A and FIG. 1B, in metal separator 1 for fuel cells according to this embodiment, trapezoid irregularities 3 are formed by alternately forming pits 2 in both sides of the metal plate. Flat portions 4 which contact upper and lower cells and slope portions 5 which connect flat portions 4 are formed by applying press working, etc. to the metal plate, and trapezoid irregularities are made. When the irregularities are made, the wall thickness of both upper and lower flat portions 4 or either of upper or lower flat portions 4 are formed uniformly and thinly to 90% or less of that of the metal plate, and then slope portions 5 are formed.

The metal plate to be formed to metal separator 1 for fuel cells consists of material having expansion of 30% or less and low ductility, for instance, Ti clad Al in which Ti is coated on both sides of plate Al, or Ti clad SUS in which Ti is coated on both sides of plate SUS (stainless steel). In this embodiment, Ti clad Al (M-TAT) or Ti clad SUS (M-TST) in which conductive nano coating (M coat) of precious metals such as Au, Pt, etc. are provided is used as a metal plate. Preferably, the M-TAT material with a low deformation resistance may be used to lower the press load at the fabrication.

Metal separator 1 for fuel cells has a rectangular plate shape, and comprises rectangular irregularities 3 where irregularities is formed in the center portion, and smooth periphery 6 which surrounds irregularities 3. In addition, manifold ports 7 which penetrates through periphery 6 is formed in the periphery 6. In this embodiment, manifold ports 7 is formed symmetrically on both sides with irregularities 3 sandwiched in a direction of length L (direction of a pit of pit portion 2), and four rectangular manifold ports 7 in total is formed symmetrically, in which two ports are placed respectively in a vertical direction and along a direction of width W.

Trapezoid irregularities which consists of flat portions 4 which forms the bottoms of pit portions 2 and slope portions 5 connected between flat portions 4 are formed in irregularities 3, in which shape of the irregularities is formed along a direction of width W of metal separator 1 for fuel cells. That is, pit portions 2 deformed to channels for a fuel gas or a oxidant gas are formed in parallel in a direction of length of metal separator 1 for fuel cells to form the parallel passage structure by irregularities 3.

Flat portions 4 in irregularities 3 consists of upper flat portions 8 (the upper side in FIG. 1B) which contact one cell and lower flat portions 9 (the lower side in FIG. 1B) which contact the other cell when the fuel cell stack is formed.

Figure 2:
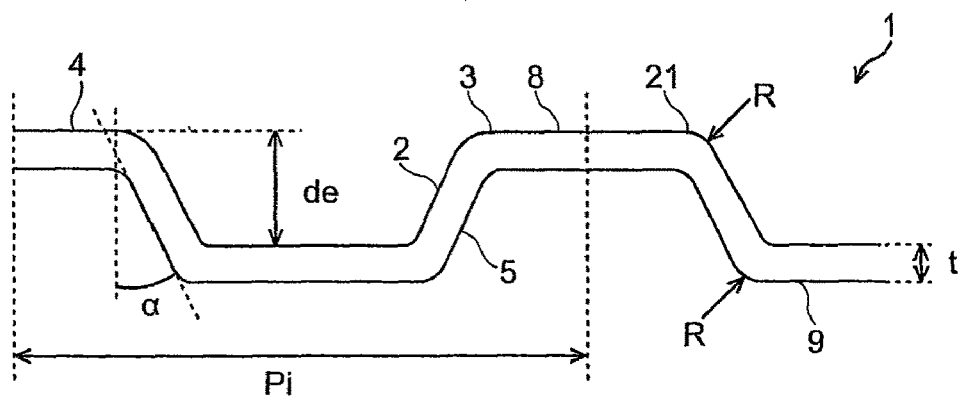
FIG. 2 is an enlarged section view of irregularities of a metal separator for fuel cells according to this embodiment.

Moreover, irregularities 3 are formed at fixed pitch Pi as shown in FIG. 2, and the depth of pit portion 2 (height of the concave portion) is formed at fixed depth de. Slope portions 5 is formed to have fixed taper angle α with respect to a vertical direction, and shoulders 21 which are connection portions of flat portions 4 and slope portions 5.

In the present embodiment, wall thickness t of both upper flat portions 8 and lower flat portions 9 or either of upper flat portions 8 or lower flat portions 9 are formed uniformly and thinly to 90% or less of that of the unprocessed metal plate t0 (wall thickness of periphery 6). The reason for this is that cracks are occurred in shoulder 21 at the fabrication when wall thickness t of flat portions 4 exceeds 90% of that t0 of the unprocessed metal plate.

Next, a method of fabricating metal separator 1 for fuel cells according to this embodiment is explained.

Figure 3:
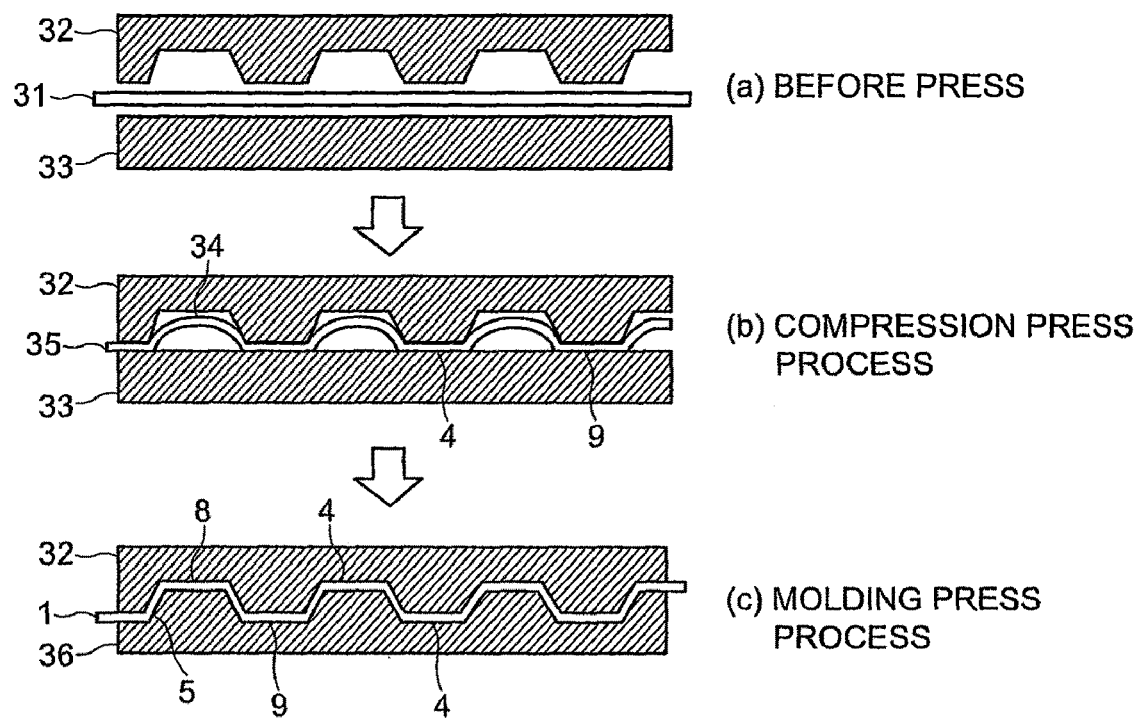
FIG. 3 is a view illustrating a method of fabricating a metal separator for fuel cells according to a first embodiment of the present invention.

As shown in FIG. 3, in a method of fabricating a metal separator for fuel cells according to the first embodiment, upper irregularities die 32 is placed first above metal plate 31, and plane die 33 is placed below metal plate 31 so as to oppose upper irregularities die 32, and then metal plate 31 is pressed from top and bottom (compression press process). At this time, the portion where the convex portion of upper irregularities die 32 comes in contact with metal plate 31 forms lower flat portions 9.

When this compression press process is performed, the compression press is performed so that wall thickness t of lower flat portions 9 may become 90% or less of wall thickness t0 of the metal plate in the first embodiment. As a result, the thinning of 10% in lower flat portions 9 protrudes in a horizontal direction (concave portion of upper irregularities die 32) to form swelling portion 34. The metal plate 31 forms near irregularities, which becomes separator substrate 35. In this compression press process, the deformation is caused mainly by compression. Therefore, the tensile stress is not occurred in the material.

Moreover, the press load increases by several times in this compression press process compared with a conventional stretch molding processing method. Therefore, the warm processing is suitable rather than the processing at room temperature in order to reduce the press load.

After the compression press process is completed, upper irregularities die 32 is placed above separator substrate 35, and lower irregularities die 36 which has the reverse irregularities of upper irregularities die 32 is placed below separator substrate 35 so as to oppose upper irregularities die 32, and then separator substrate 35 is pressed from top and bottom (molding press process). By this molding press process, slope portions 5 and upper flat portions 8 are formed in swelling portions 34 of separator substrate 35, and the shape of irregularities 3 is formed.

At this time, because swelling portions 34 are formed in the compression press process and the fabrication thickness (thickness of swelling portions 34) is taken greatly, the tensile stress is hardly occurred in the molding press process, and deformed under the compressive stress.

Moreover, compressibility t/to of lower flat portions 9 (wall thickness ratio) is set smaller than reciprocals of the expansion rate when metal plate 31 is formed to irregularities.

Here, the processing limit of metal plate 31 is explained. The processing limit of metal plate 31 is determined depending on the condition to cause the compression distortion due to the wall thickness decrease, which is equivalent to an amount of the expansion distortion when metal plate 31 is formed to irregularities. That is, the condition to make compressibility t/to of wall thickness t of lower flat portions 9 to wall thickness to of metal plate 31 equivalent to expansion rate in a direction of width of pit portion 2 is the processing limit.

Because the expansion rate of FIG. 2 is shown in (Pi+(1/cos α−tan α)deX2)/Pi. Therefore, the condition of the processing limit can be shown in $$t/to = Pi/(Pi+(1/\cos\alpha - \tan\alpha)de\times 2) \quad (1)$$

Because an amount of the compression of lower flat portions 9 supplements an amount of the expansion of slope portion 5 formed on both sides thereof by setting compressibility t/to less than the critical value of processing of formula (1), cracks are caused at the fabrication, and reliable metal separator 1 for fuel cells can be formed.

Metal separator 1 for fuel cells of FIG. 1 can be obtained as described above.

In metal separator 1 for fuel cells according to this embodiment, the slant portions are formed after forming uniformly and thinly wall thickness of both upper flat portions 8 and lower flat portions 9 or either of the upper flat portions 8 or the lower flat portions 9 to 90% or less of that of the metal plate 31.

By forming wall thickness t of either of upper flat portions 8 or lower flat portions 9 to 90% or less of that of the metal plate 31 to be formed in metal separator 1 for fuel cells, thinning runs over in a horizontal direction to increase thickness of a portion to be formed as slope portion. Therefore, any cracks are not occurred during a molding press process, and even when a process resistant material with low ductility such as M-TAT material, M-TST material, etc. is used, it becomes possible to process complex irregularities. In addition, when a material having good processing characteristic such as gold nano clad SUS (SUS316) etc. is used, it is possible to form higher irregularities and a rapider taper corner, comparative to the prior art. Therefore, more complex channels can be formed.

Moreover, when the M-TAT material with low ductility is especially used as metal plate 31, only shallow channel form can be formed in the conventional stretch molding method. Therefore, performance characteristic of the separator is low. However, according to this embodiment, metal separator 1 for fuel cells having proper wall thickness of flat portions 4 can be obtained if the M-TAT material is used. Namely, it is possible to make wall thickness of flat portions thin, the depth de of pits deep, taper angle α rapid, and contact side of flat portions 4 wide to obtain suitable shape of separator by which the pressure loss is low, the characteristic is good, the weight is light and the life time is long.

In addition, even if thin metal having a worse processing characteristic than M-TAT material or M-TST material is used as metal plate 31, it is possible to process to a suitable shape for a separator according to this embodiment.

In metal separator 1 for fuel cells according to this embodiment, compressibility t/to of flat portions 4 is set smaller than the reciprocal of the expansion rate by forming metal plate 31 to irregularities.

That is, an amount of the expansion of slope portion 5 can be supplemented by an amount of compression of flat portions 4 by setting compressibility t/to to a smaller value than the processing limit of formula (1), and the occurrence of cracks can be controlled at a molding press process.

Moreover, the method of fabricating a metal separator for fuel cells according to the first embodiment comprises the steps of: a compression press process for adjusting the wall thickness of flat portions to 90% or less by applying a compressive stress to the position where corresponds to lower flat portions 9 of metal plate 31, thereby, forming lower flat portions 9 and swelling portions 34, and a molding press process for forming slope portions 5 and upper flat portions 8 at the swelling portions.

In general, the form of destruction changes greatly according to whether the stress applied to metal material (metal plate 31 or separator substrate 35) is either tensile stress or compression stress in press working. The deformation and the yield stresses of the metal material take almost the same value regardless of the tensile stress or the compression stress, and the plastic deformation starts from the same value. However, whether or not cracks occur depend greatly upon state of the stress applied. The differences from several times to tens are made according to the state of the stress.

Because the tensile stress is not caused in forming press process by forming swelling portion 34 by using a compression press process, and the deformation is performed by the compressive stress in a method of fabricating a metal separator for fuel cells according to a first embodiment, the crack is never caused in shoulder 21 where the expansion becomes maximum at the fabrication, and normal metal separator 1 for fuel cells can be formed.

Next, a method of fabricating a metal separator for a fuel cell according to a second embodiment is explained.

Figure 4:
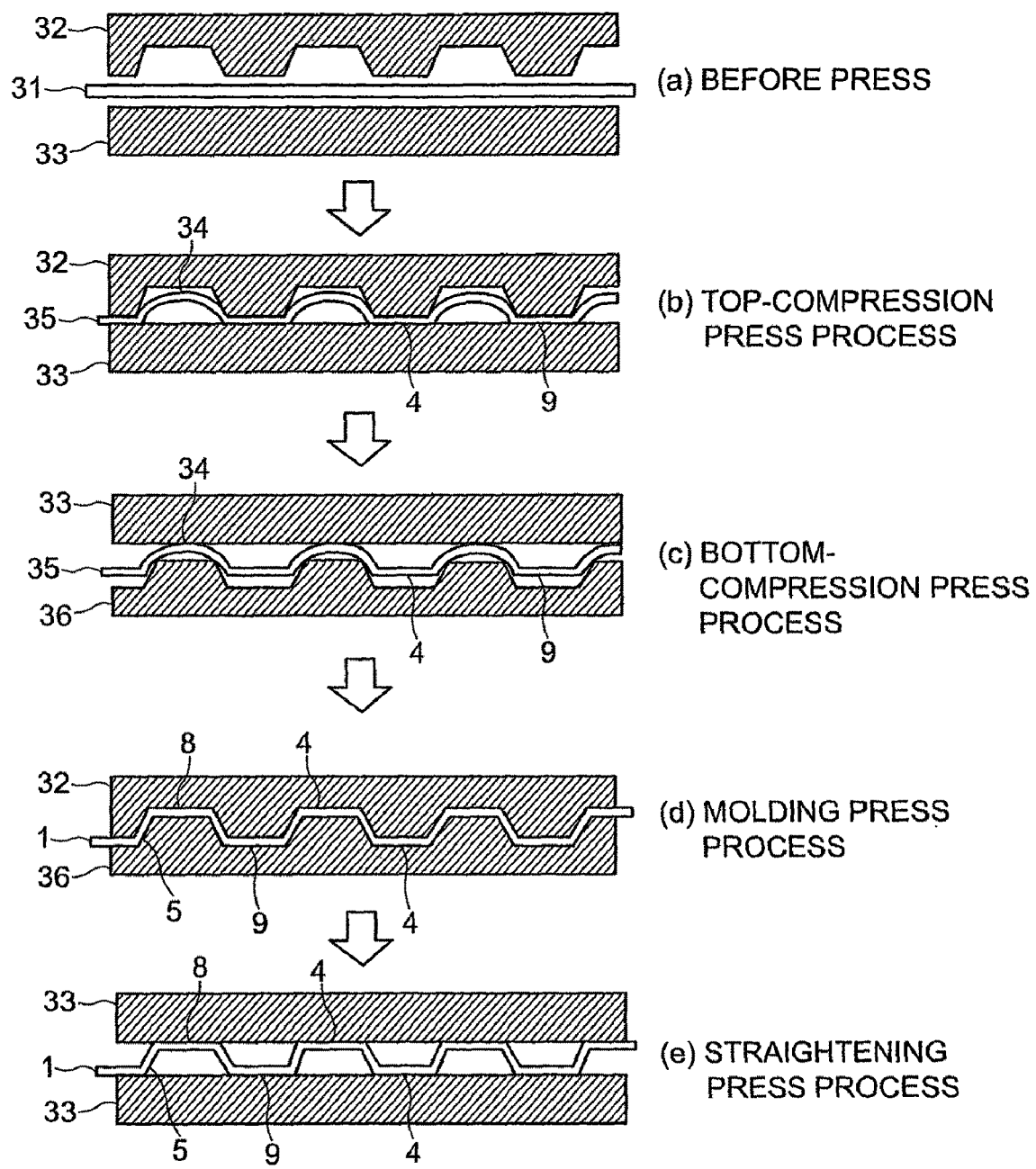
FIG. 4 is a view illustrating a method of fabricating a metal separator for fuel cells according to a second embodiment of the present invention.

A method of fabricating a metal separator for fuel cells according to a second embodiment shown in FIG. 4 is basically the same as the first embodiment shown in FIG. 3. In this embodiment, there is provided an bottom-compression press process (a second compression press process) between the compression press process and the forming press process. In FIG. 4, a top-compression press process (the first compression press process) is the same as the compression press process of FIG. 3 explained in the first embodiment.

In the bottom-compression press process, plane die 33 is placed above separator substrate 35 and bottom irregularities die 36 is placed below separator substrate 35 at a position opposed to plane die 33. After placing separator substrate 35 between plane die 33 and bottom irregularities die 36, pressing is performed from a vertical direction. As a result, the swelling portions 34 deformed to upper flat portions 8 are compressed with convex portions of bottom irregularities die 35.

At this time, the compression-press is performed so that the wall thickness of upper flat portions 8 may become 90% or less of that of the metal plate. As a result, the thinning of 10% in upper flat portions 8 protrudes into portions corresponding to slope portions 5 of swelling portions 34, and the wall thickness in the portion corresponding to slope portions 5 of swelling portions 34 is thickened further.

That is, because the thinning of upper flat portions 8 and lower flat portions 9 shifts to the portion corresponding to slope portions 5 of swelling portions 34; Forming slope portion 5 more stably in a molding press process becomes possible, and depth de of pit portion 2 can be formed more deeply.

The profile irregularity of flat portions 4 may be improved by pressing metal plate 31 from the top and bottom using two plane dies 33 after the molding press process is performed (straightening press process).

Preferably, a method of fabricating a metal separator for fuel cells according to the second embodiment is used when enough pit depth de cannot be secured by using a method of fabricating a metal separator for fuel cells according to the first embodiment.

Metal plate 31 consists of Ti clad SUS (M-TST) material or Ti clad Al (M-TAT) material which conductive nano coating (M coat) is coated on the surface in the above-mentioned embodiment, but are not limited to these materials. For instance, materials which consist of SUS etc., which contain Au nano clad SUS (SUS316) or conductive sludge may be used.

Moreover, though metal separator 1 for fuel cells has a parallel passage structure in the above-mentioned embodiment, a serpentine structure may be also used.

Embodiment

M-TAT0.3t (Embodiment 1), M-TST0.2t (Embodiment 2), and M-TST0.1t (Embodiment 3), which a conductive nano coating (M coat) is provided on their surfaces are used as metal plate 31.

Details of each clad material is as follows.

M-TAT materials:

A clad material of pure Ti/A5183/pure Ti, on which Au of 9 nm is coated as M coat.

A pure Ti clad ratio 20%

M-TST materials:

A clad material of pure Ti/SUS430/pure Ti, on which Au of 9 nm is coated as M coat.

A pure Ti clad ratio 20%

Table 1 shows tensile characteristics and tensile elongation of these materials. In Table 1, the tensile characteristics and the tensile elongation of the material unit of Ti, Al, SUS430 and SUS304 are additionally shown for the sake of comparison.

TABLE 1

| | | Tensile strength (MPa) | Expansion (%) |
|---|---|---|---|
| Material Itself | Ti | 340 | 34 |
| | Al | 284 | 21 |
| | SUS430 | 480 | 25 |
| | SUS304 | 510 | 45 |
| Clad Material | M-TAT0.3t (Embodiment 1) | 324 | 19 |
| | M-TAT0.3t (Embodiment 1) | 522 | 29 |
| | M-TAT0.3t (Embodiment 1) | 516 | 20 |

The tensile strength of M-TAT material is about 320 MPa, and that of M-TST material is about 520 MPa as shown in Table 1. M-TAT material is considerably lower in tensile strength than M-TST material. The tensile elongation is about 20% in M-TAT0.3t, about 30% in M-TST0.2t, and about 20% in M-TST0.1t. As board thickness becomes thinner, the tensile elongation decreases. The expansion of the M-TAT material is less than that of the M-TST material.

Small type metal separators 1 for fuel cells shown in FIG. 1 is fabricated by using these metal plates 31. Metal separator 1 for fuel cells is 67 mm in length L, 32 mm in width and 0.7 mm in wall thickness to of peripheries 6. There are provided manifold ports 7 in smooth periphery 6, and irregularities 3 having irregularities in the center section. As shown in FIG. 2, irregularities 3 have wavy irregularities of fixed pitch Pi, where the wavy irregularities have upper flat portions and lower flat portions, which form pit portions 2 of de in depth, and slope portion 5 whose inclination angle is α. The pit spacing on the anode side may be different on the cathode side. In embodiments 1-3, assumed Pi equals to 3 mm and α equals to 45 degree, separators with different pit depth de were fabricated, and the processing limit was examined.

Figure 6:
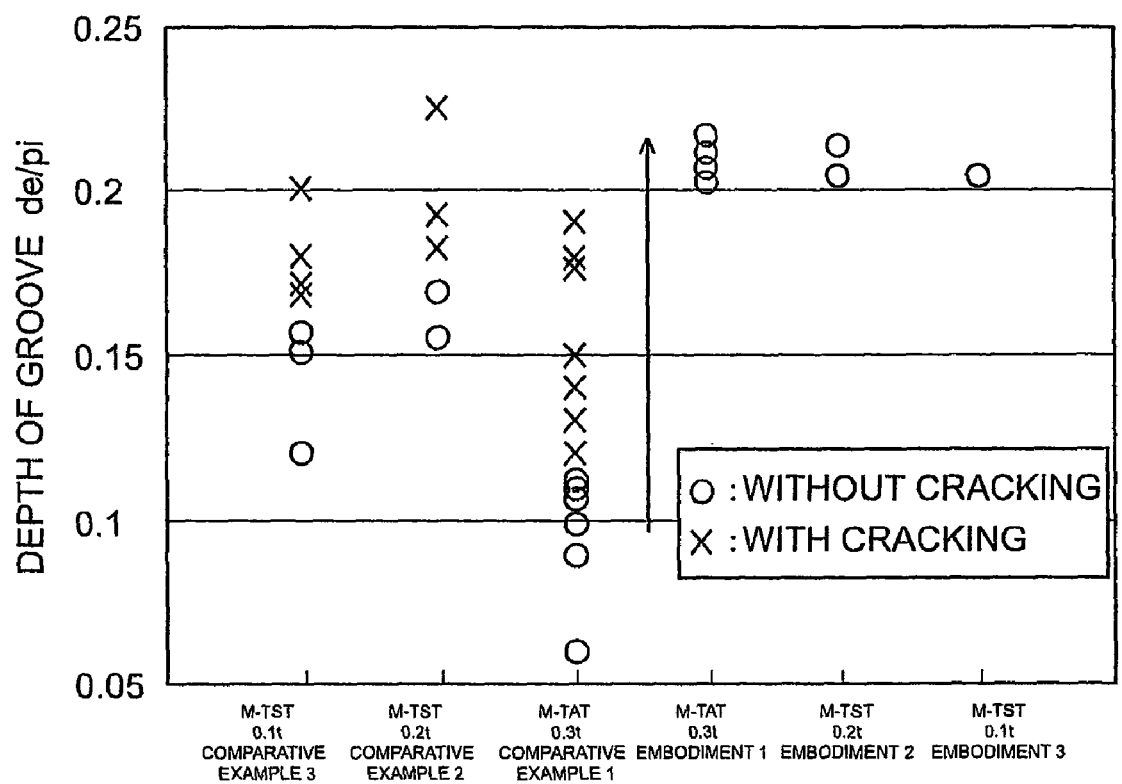
FIG. 6 is a comparative view showing processing limits of stretch molding of the present invention and the prior art.

Moreover, as comparative examples, metal separators for fuel cells were fabricated by using metal plates of M-TAT0.3t (comparative example 1), M-TST0.2t (comparative example 2) and M-TST0.1t (comparative example 3) in the conventional stretch molding method. The comparison results in the processing limit are shown in FIG. 6. Noughts-and-crosses of FIG. 6 show the presence of the crack.

Figure 5:
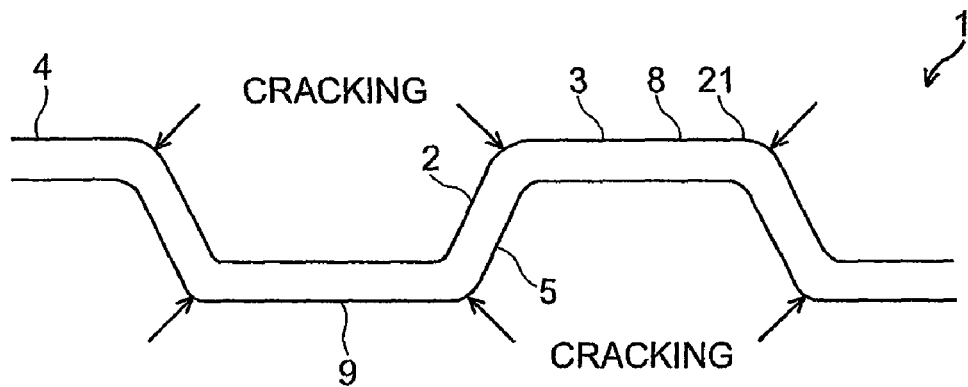
FIG. 5 is an illustration of cracking caused when a metal separator for fuel cells is formed.

The cracks occur in shoulder portion 21 of wavy irregularities when pit depth rate de/Pi increases in comparative examples 1-3 as shown in FIG. 6 (Refer to FIG. 5). With regard to the processing limit value, de/Pi is 0.11 in comparative example 1, de/Pi is 0.17 in comparative example 2, and de/Pi is 0.16 in comparative example 3. This processing limit value is concerned with tensile elongation to some extent. Accurately, cracks occur when an amount of the expansion by tension and irregularities bend exceeds a limit value of the material, and the cracks occur in shoulder portion 21 where the expansion becomes the maximum. Therefore, deep pit depth cannot be formed in the material with small expansion by using a conventional stretch molding method.

On the other hand, in embodiments 1-3 according to the present invention, the compressed material protrudes in a horizontal direction, and the bending deformation is caused by the excess thickness to form wavy irregularities as shown in FIG. 3. Therefore, the tensile stress is not occurred in the material. Although the pit depth ratio de/Pi=0.2 (Pi=3 mm, de=0.6 mm) in embodiments 1-3 was more than the processing limit value of the material in embodiments 1-3, no crack occur in shoulder 21, and normal separator was fabricated. Thus, the difference in formability between the comparative examples and the present invention is remarkable. In embodiments 1-3, the coating did not flaked off and all were sound though M coat processing by which the nano coating of Au is coated had been done on the surface of the metal plate used.

Figure 7:
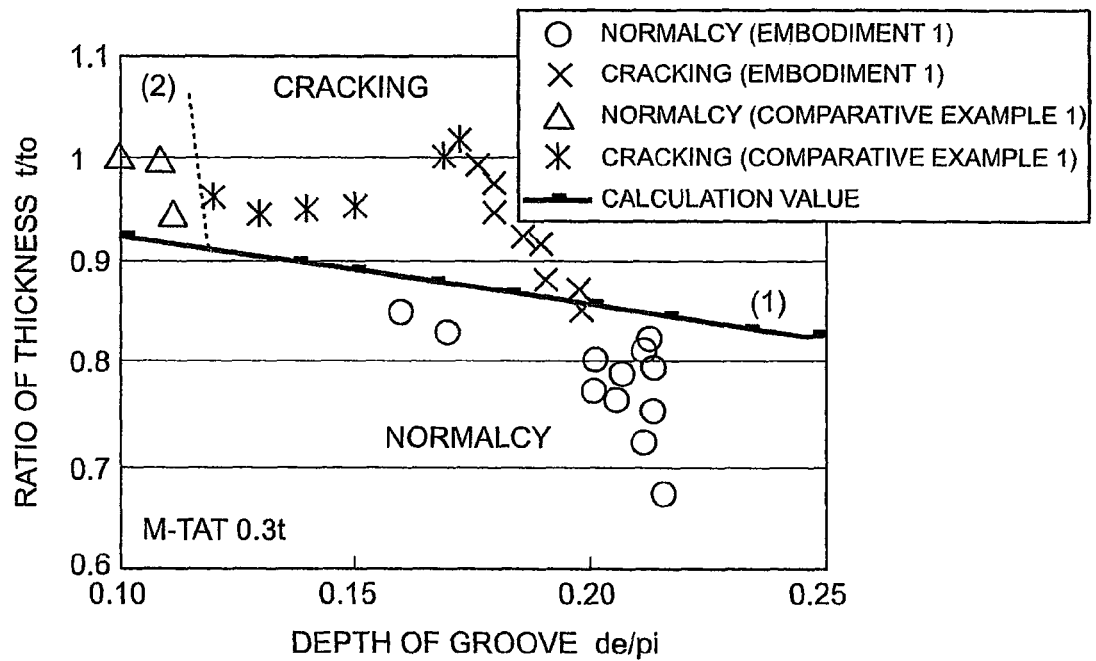
FIG. 7 is a view showing processing limit of depth of pits and ratio of wall thickness with respect to M-TAT0.3t material.
Figure 8:
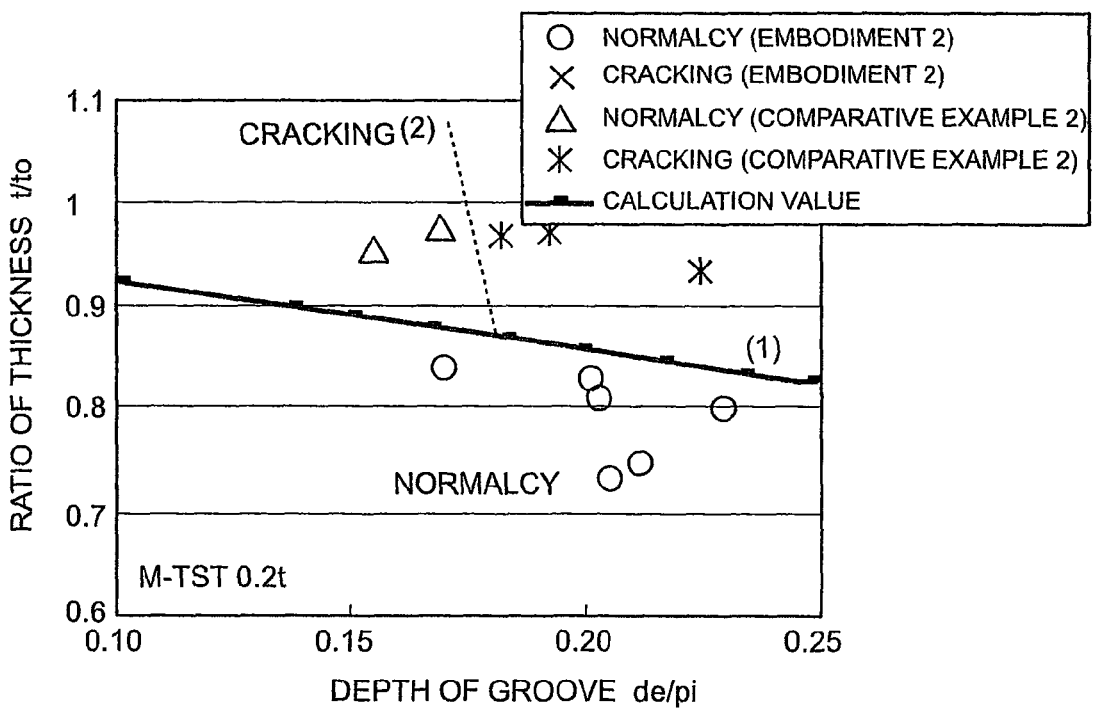
FIG. 8 is a view showing processing limit of depth of pits and ratio of wall thickness with respect to M-TST0.2t material.
Figure 9:
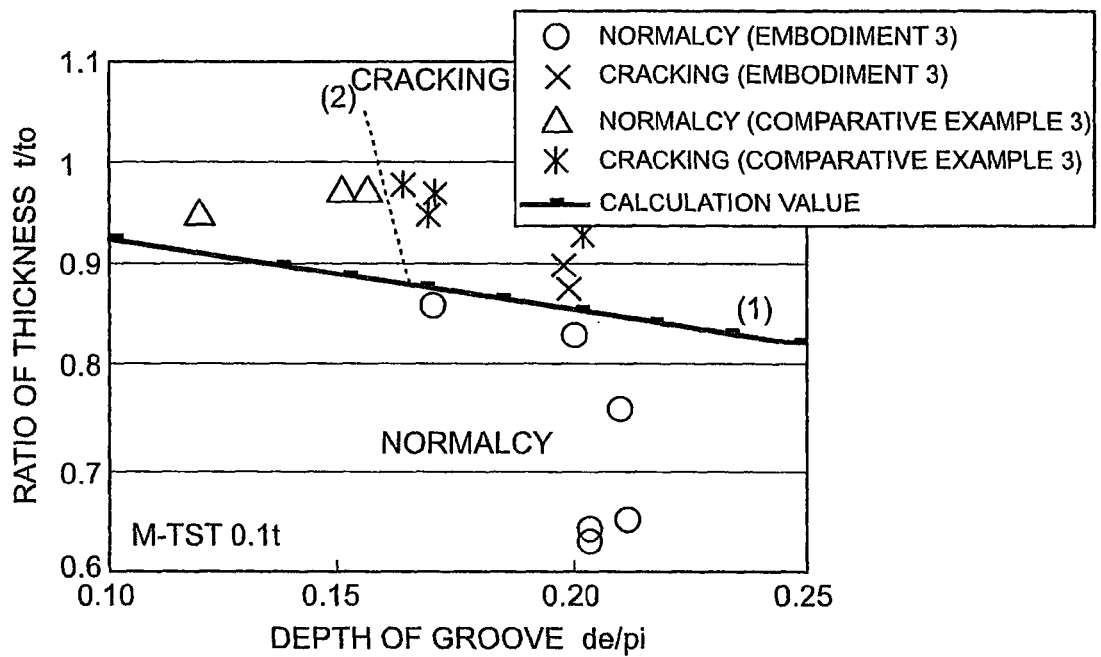
FIG. 9 is a view showing processing limit of depth of pits and ratio of wall thickness with respect to M-TST0.1t material.
Figure 10:
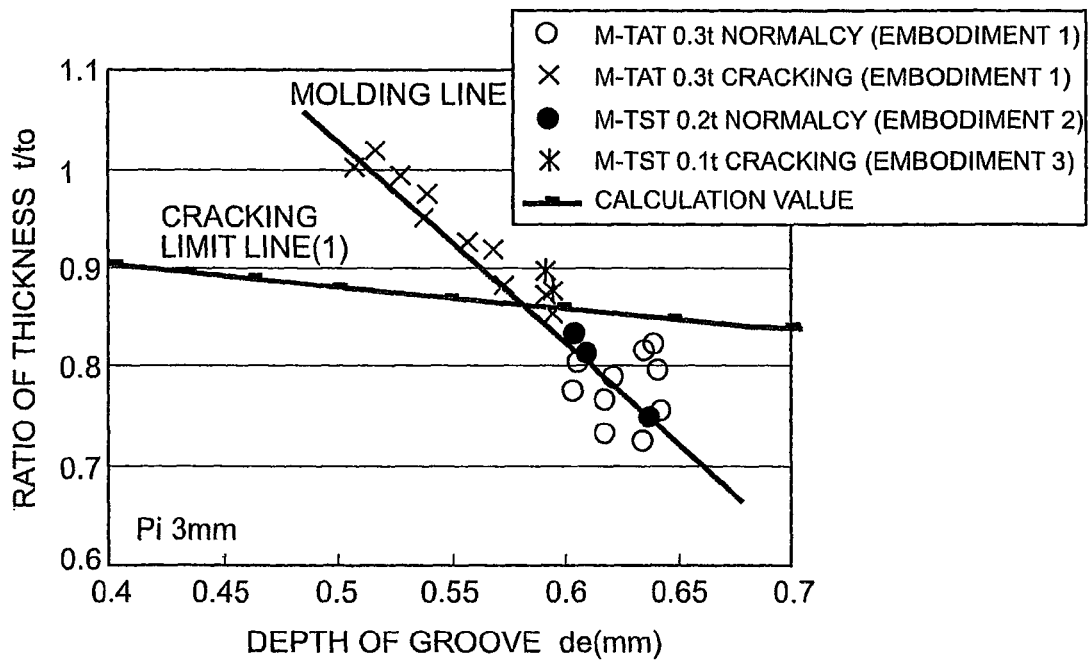
FIG. 10 is a view showing processing limit of depth of pits and ratio of wall thickness with respect to M-TAT0.3t material, M-TST0.2t material, and M-TST0.1t material.
Figure 11:
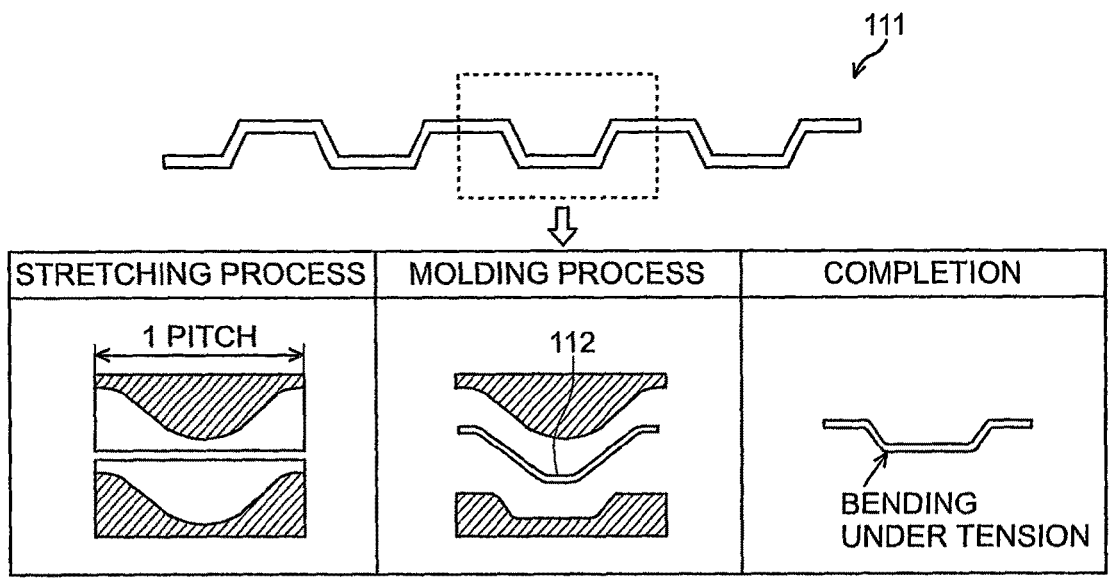
FIG. 11 is a view illustrating one example of a conventional method of fabricating a metal separator for a fuel.
Figure 12:
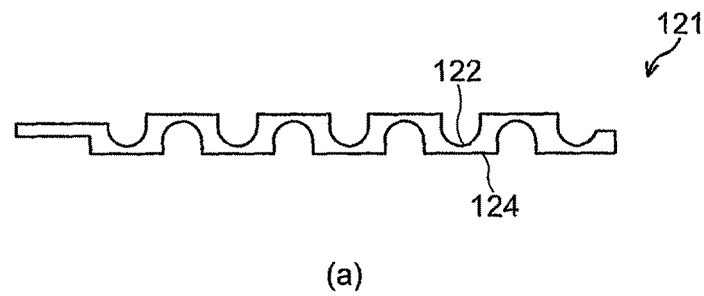
FIG. 12A is a schematic view showing one example of a conventional metal separator for fuel cells.
FIG. 12B is a view illustrating a conventional fabricating method.
Figure 12:
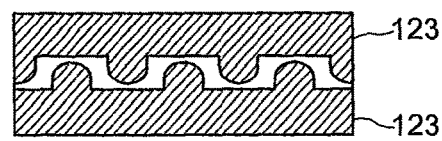

Wall thickness ratio t/to due to deformation was changed to clarify by what reason the difference in the processing limits according to the above-mentioned processing method was occurred. FIGS. 7 to 9 show the processing limit based on wall thickness ratio t/to of bottom faces (flat portions 4) of pit portion 2 before and after the fabrication by press working. FIG. 7 shows the processing limit of M-TAT0.3t material (embodiment 1 and comparative example 1), FIG. 8 shows that of M-TST0.2t material (embodiment 2 and comparative example 2) and FIG. 9 shows that of M-TST0.1t material (embodiment 3 and comparative example 3). FIG. 10 shows the processing limit concerning wall thickness ratio t/to and pit depth de in embodiment 1-3, normalized by a fixed fabrication condition (mold line).

Wall thickness ratio t/to is 0.95 to 1 in comparative example 1-3 and also in each of FIGS. 7-9. The wall thickness has hardly changed by press working, and when the stretch molding deformation due to pit formation and the expansion rate due to irregularities bending deformation exceed a threshold value of the material, the crack is occurred. On the other hand, wall thickness ratio t/to is determined based on the wall thickness decrease in the compression press process in embodiments 1-3 according to the present invention. Therefore, though cracks remains in the condition that wall thickness decreases is small, the crack of shoulder 21 is disappeared when the wall thickness is thinned more than a certain limit. After that, cracks never occur any more, and it becomes sound.

In this processing limit, t/to is about 0.9 or less. It becomes possible to obtain good products by forming uniformly and thinly wall thickness of flat portions to 90% or less of that of unprocessed metal plate 31. Metal separator 1 for fuel cells in which wall thickness of flat portions 4 is thinner than the wall thickness of periphery 6 like this cannot be made as long as the present invention is not used.

The processing limit of comparative example 1-3 is shown in dotted line (2) in FIGS. 7-9. These process limits mean that the expansion rate due to the stretch molding deformation and bending deformation exceed a limit value of the material, and change according to the kind of material. Therefore, good processing area broadens according to the magnitude of expansion.

In addition, the value calculated by formula (1) is indicated as a calculation value in FIGS. 7-10. The calculation value calculated by formula (1) is corresponding to the limit condition value of the occurrence of cracks in embodiments 1-3 as shown in FIG. 7-10. Therefore, normal metal separator 1 for fuel cells can be formed regardless of ductility of the material even when a material having a bad processing characteristics is used by setting wall thickness ratio t/to before and after the processing less than formula (1)

That is, normal metal separator 1 for fuel cells without cracks can be obtained by reducing wall thickness t of flat portions 4 from wall thickness t0 of unprocessed metal plate 31 (wall thickness of periphery portion 6) to less than the ratio given by formula (1) according to the present invention.

What is claimed is:

1. A metal separator for fuel cells formed with a metal plate and provided between cells accumulated, in which the metal plate is formed like trapezoidal irregularities to separate channels for a fuel gas from ones for an oxidant gas,
wherein slope portions are formed after forming uniformly and thinly wall thickness of both upper and lower flat portions or either of the upper or the lower flat portion to 90% or less of that of the metal plate to be formed to obtain trapezoidal irregularities by forming flat portions which contact upper and lower cells and slope portions which interconnect the upper and the lower flat portions.

2. The metal separator for fuel cells according to claim 1, wherein said metal plate consists of material having expansion of 30% or less and low ductility.

3. The metal separator for fuel cells according to claim 1, wherein said metal plate consist of Ti clad aluminum in which Ti covers both sides of plate aluminum or Ti clad stainless steel in which Ti covers both sides of plate stainless steel.

4. The metal separator for fuel cells according to claim 1, wherein the wall thickness of said flat portions is adjusted to 90% or less by applying a compressive stress to the position where corresponds to flat portions of said metal plate by press working, thereby, lower flat portions which contact one side of said cell and a swelling portion between the lower flat portions are formed, and then slope portions and an upper flat portion are formed at this swelling portion by press working.

5. The metal separator for fuel cells according to claim 1, wherein compressibility of said flat portions is set to a value smaller than reciprocal of the expansion rate by forming said metal plate to irregularities.

6. A method of fabricating a metal separator for fuel cells formed with a metal plate and provided between cells accumulated, in which the metal plate is formed like trapezoidal irregularities to separate channels for a fuel gas from ones for an oxidant gas, which comprises a step of:
    forming slope portions after forming uniformly and thinly wall thickness of both upper and lower flat portions or either of the upper or the lower flat portions to 90% or less of that of the metal plate to be formed in order to obtain trapezoidal irregularities by forming flat portions which contact upper and lower cells, and slope portions which interconnect the upper and the lower flat portions.

7. The method of fabricating a metal separator for fuel cells according to claim 6, wherein
    said slope portion forming step includes:
    a compression press process for adjusting the wall thickness of said flat portions to 90% or less by applying a compressive stress to the position where corresponds to flat portions of said metal plate, thereby, forming lower flat portions which contact one side of said cell and a swelling portion between the lower flat portions; and
    a molding press process for forming slope portions and upper flat portions at the swelling portions.

8. The method of fabricating a metal separator for fuel cells, according to claim 6, wherein
    said slope portion forming step includes:
    a first compression press process for adjusting the wall thickness of said flat portions to 90% or less by applying a compressive stress to the position where corresponds to flat portion of said metal plate, thereby, forming lower flat portions which contact one side of said cell and a swelling portion between the lower flat portions;
    a second compression press process for applying a compressive stress to the position where corresponds to an upper flat portion of said swelling portion and adjusting the wall thickness of said upper flat portion to 90% or less; and
    a molding press process for forming slope portions and an upper flat portion at this swelling portion.

9. A metal separator for fuel cells formed with a metal plate and provided between cells accumulated, in which the metal plate is formed like trapezoidal irregularities to separate channels for a fuel gas from ones for an oxidant gas,
    wherein wall thickness of both upper and lower flat portions or either of the upper or the lower flat portion is 90% or less of that of the metal plate.

* * * * *